(12) United States Patent
Yu

(10) Patent No.: US 6,330,853 B1
(45) Date of Patent: Dec. 18, 2001

(54) ROTISSERIE

(76) Inventor: Chih-Hsin Yu, 4F-3, No. 123, Lane 235, Pao-Chiao Road, Hsin Tien City (TW)

( * ) Notice: Subject to any disclaimer, the term of this patent is extended or adjusted under 35 U.S.C. 154(b) by 0 days.

(21) Appl. No.: 09/855,489

(22) Filed: May 16, 2001

(51) Int. Cl.[7] .............................. A47J 37/00; A47J 37/04; A47J 37/07
(52) U.S. Cl. .......................... 99/421 H; 99/419; 99/446; 99/450
(58) Field of Search ..................... 99/339–341, 419–421, 99/400, 401, 444–450, 481, 482; 219/400, 401; 126/25 R, 9 R, 41 R; 426/523, 466

(56) References Cited

U.S. PATENT DOCUMENTS

| | | | |
|---|---|---|---|
| 3,113,504 | * | 12/1963 | Reed ................................. 99/421 H |
| 3,247,827 | * | 4/1966 | Cremer ............................. 99/421 H |
| 3,733,999 | * | 5/1973 | Bernstein ......................... 99/339 X |
| 4,598,690 | * | 7/1986 | Hsu ................................. 126/25 R |
| 4,810,856 | * | 3/1989 | Jovanovic ......................... 219/401 |
| 4,924,766 | * | 5/1990 | Hitch ............................... 99/421 HV |
| 5,195,425 | * | 3/1993 | Koziol ............................. 99/447 X |
| 5,333,540 | * | 8/1994 | Mazzocchi ....................... 99/450 X |
| 5,421,318 | * | 6/1995 | Unruh et al. ...................... 126/9 R |
| 5,536,518 | * | 7/1996 | Rummel ............................ 426/523 |
| 5,649,475 | * | 7/1997 | Murphy et al. .................. 99/421 H |
| 5,819,639 | * | 10/1998 | Spell ............................... 99/446 X |
| 5,832,811 | * | 11/1998 | King ............................... 99/419 X |

\* cited by examiner

Primary Examiner—Timothy F. Simone
(74) Attorney, Agent, or Firm—Bacon & Thomas, PLLC

(57) ABSTRACT

A rotisserie comprises an oven having a space for receiving objects used for broiling, two brackets each including at least one pair of parallel elongate openings, at least one longitudinal groove coupled the elongate openings of each pair together, at least one fastener driven through openings to secure bracket to the front or the rear side of oven, and a recess disposed at one end thereof, a motor having at least one fastening member put on one bracket, a telescopic bar with one end inserted into motor and the other end rotatably supported on the recess, and two opposite forks on the bar. The distance between a broiled thing and the fire in oven, i.e., the height of brackets and bar, may be adjusted by adjusting the positions of fasteners in openings.

5 Claims, 4 Drawing Sheets

ROTISSERIE

FIELD OF THE INVENTION

The present invention relates to rotisseries and more particularly to a rotisserie with improved characteristics.

BACKGROUND OF THE INVENTION

A conventional rotisserie 40 is shown in FIG. 4 comprising an oven 41 having a longitudinal cross-section of U, a space 411 surrounded by oven 41 for receiving objects used for broiling such as nozzle of oven, gridiron, charcoal, etc., a first bracket 42 on the front side of oven 41 and including a planar plate 421, a plurality of elongate openings 422, a plurality of thumbscrews 423 (two are shown) driven through openings 422 to secure first bracket 42 to the front side of oven 41, two side plates 424 integrally formed with and perpendicular to the planar plate 421, and a plurality of vertically spaced holes 425 on the side plate 424, a second bracket 43 on the rear side of oven 41 and including a plurality of openings 431, a plurality of thumbscrews 432 (two are shown) driven through openings 431 to secure second bracket 43 to the rear side of oven 41, a bar 44 across the first and the second brackets 42 and 43, a motor 45 at the front end of bar 44 supported between the side plates 424 of the first bracket 42, and two opposite forks 441 on the intermediate portion of the bar 44. A thing to be broiled (e.g., meat (not shown)) is impaled by forks 441 and placed on the bar 44. Thus, it is possible to broil the thing by the oven 41 when the bar 44 is turned by the activated motor 45.

But this conventional rotisserie 40 is unsatisfactory for the purpose for which the invention is concerned for the following reasons: a) During the broiling, if user desires to adjust the distance between the broiled thing and the fire in the oven 41 or accessing objects in the space 411 of oven 41 it is required to unscrew thumbscrews 423 and 432 from holes 425 and openings 422, 431 respectively Then adjust the height of first and second brackets 42 and 43. Finally, adjust the distance between the broiled thing and the fire in the oven 41. b) In the case that any of holes 425 and openings 431 is disposed in an exact position, it would be difficult to drive thumbscrews 4223 and 432 through holes 425 and openings 431 for securing first and second brackets 42 and 43 to the front and rear sides of oven 41 respectively. Such rotisserie 40 is not convenient in use, especially in performing above operations. c) In almost all cases one bar 44 is specifically designed to match with one oven 41 of the same set In other words, it is impossible to mount one bar 44 onto oven 41 of another type. Hence, once either of bar 44 or oven 41 is damaged, user has to discard other remaining components of rotisserie 40 and buy a new rotisserie. This additional expense is not desirable. Thus improvement exists in order to overcome the above drawbacks of prior art.

SUMMARY OF THE INVENTION

It is an object of the present invention to provide a rotisserie comprising an oven having a space therein; two brackets each including at least one pair of parallel elongate openings, at least one longitudinal groove coupled the elongate openings of each pair together, at least one thumbscrew driven through the openings to secure the bracket to the front or the rear side of the oven, and a recess on one end thereof; a motor having at least one fastening member on the side facing the oven put on one of the brackets; a bar including a plurality of sections threadedly secured together with one end inserted into the motor and the other end rotatably supported on the recess of one of the brackets; and two opposite forks on the bar wherein the prongs of the forks are parallel with respect to the bar, the forks are slidable and threadedly secured to the bar by fasteners when a predetermined distance between the forks is adjusted.

The above and other objects, features and advantages of the present invention will become apparent from the following detailed description taken with the accompanying drawings.

DETAILED DESCRIPTION OF THE PREFERRED EMBODIMENTS

Figure 1:
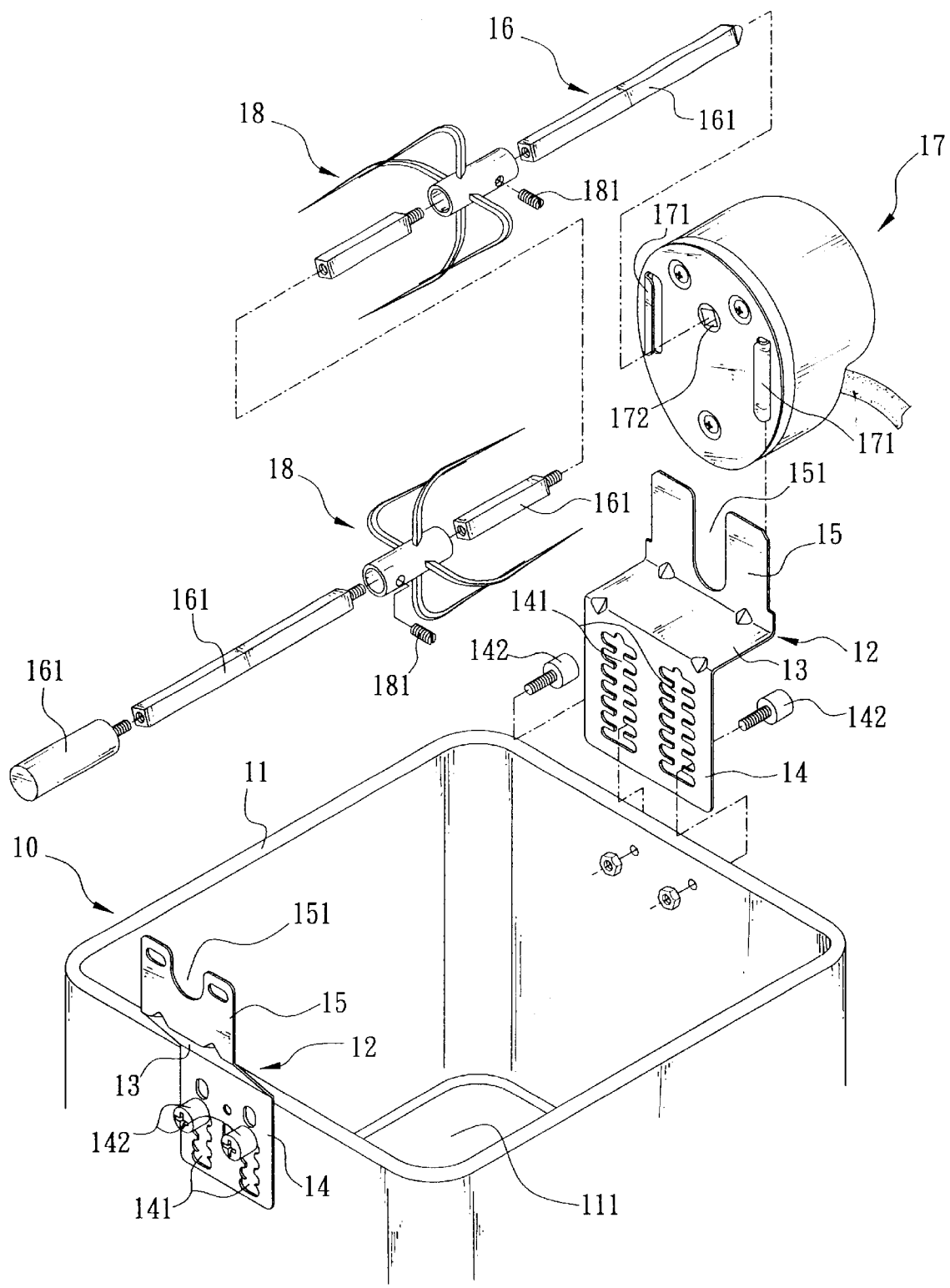
FIG. 1 is an exploded perspective view of a rotisserie according to the invention.
Figure 2:
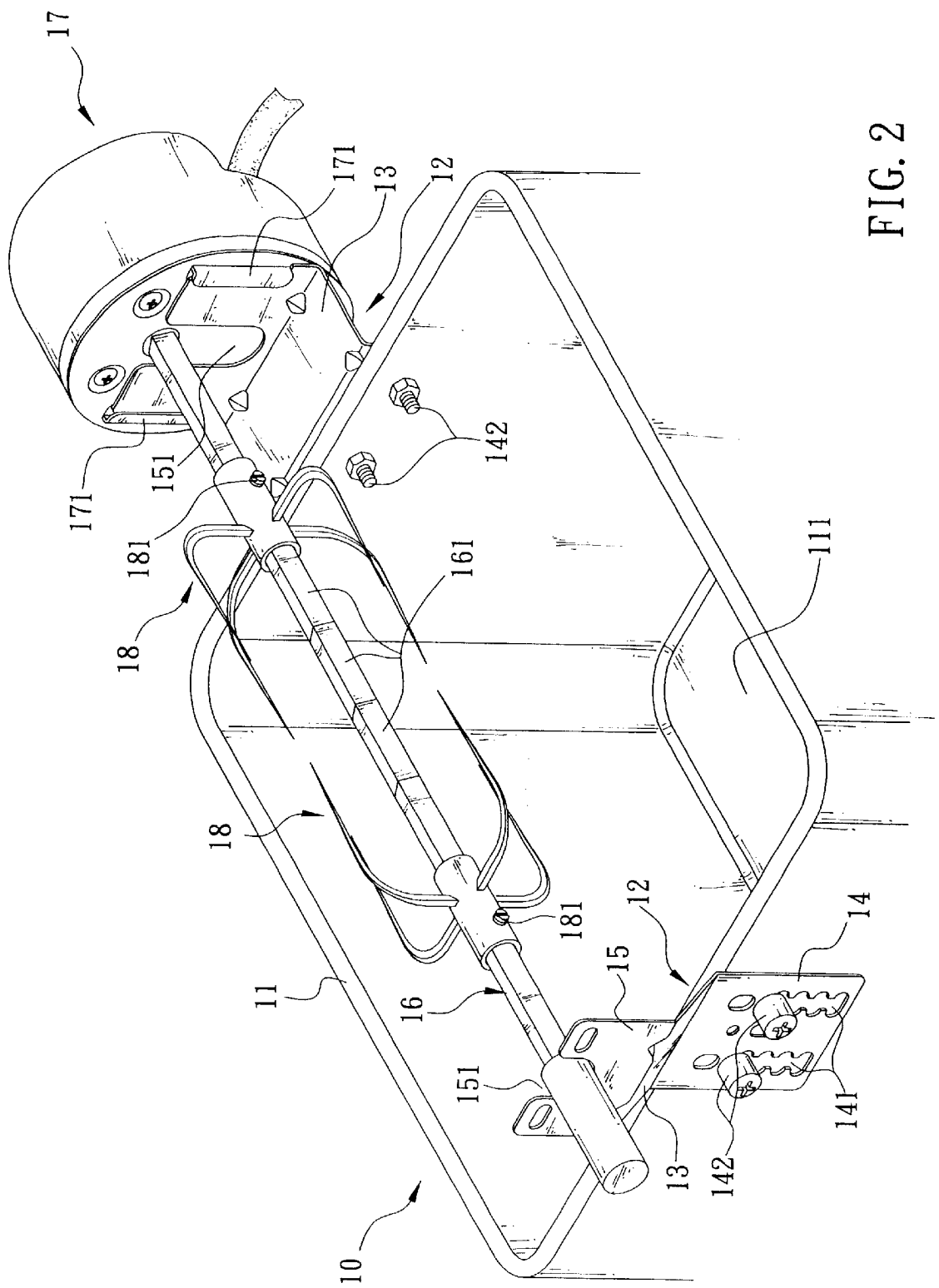
FIG. 2 is a perspective view of rotisserie shown in FIG. 1.
Figure 3:
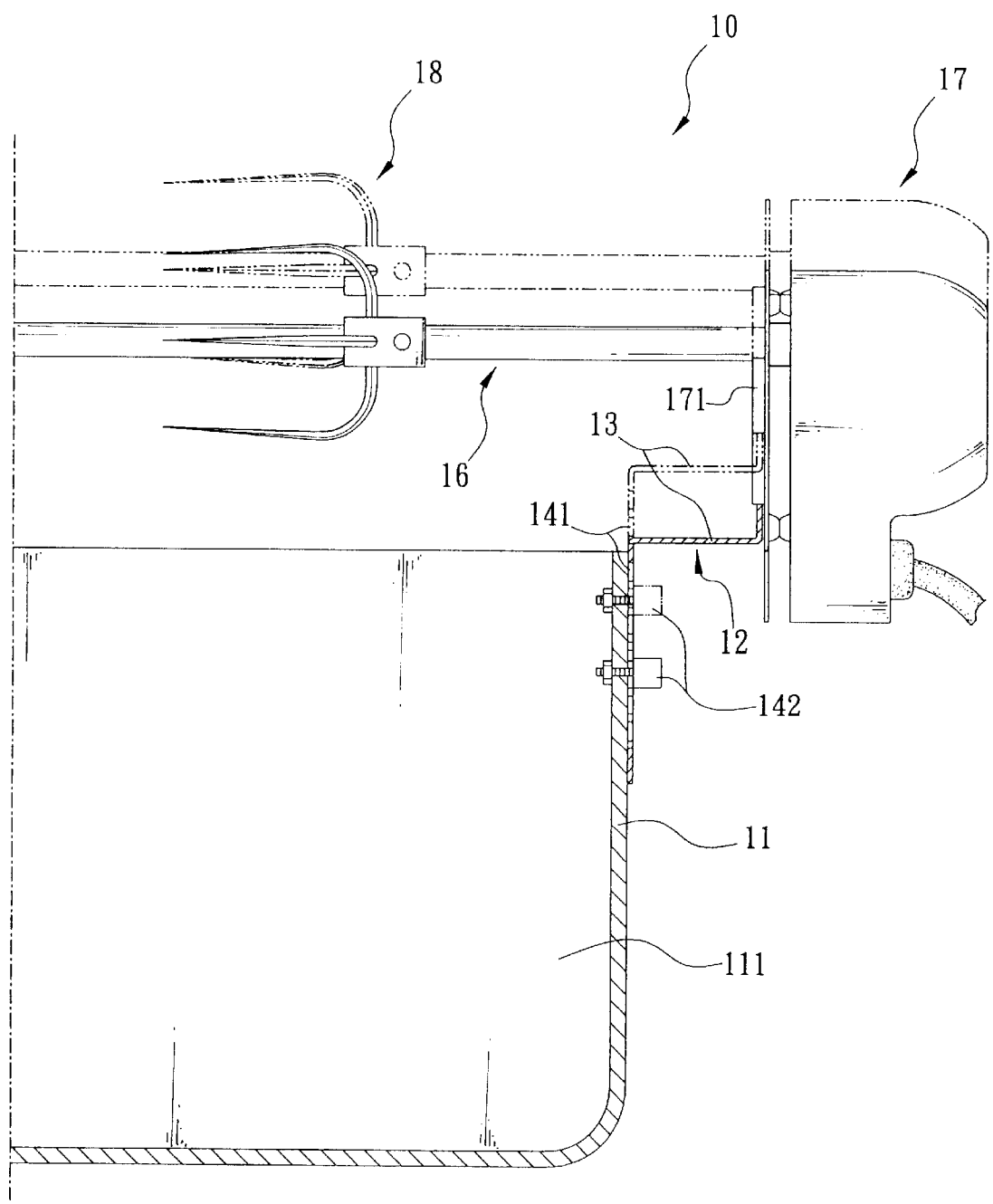
FIG. 3 is a side view in part section illustrating the height adjustment of bracket of FIG. 1.
Figure 4:
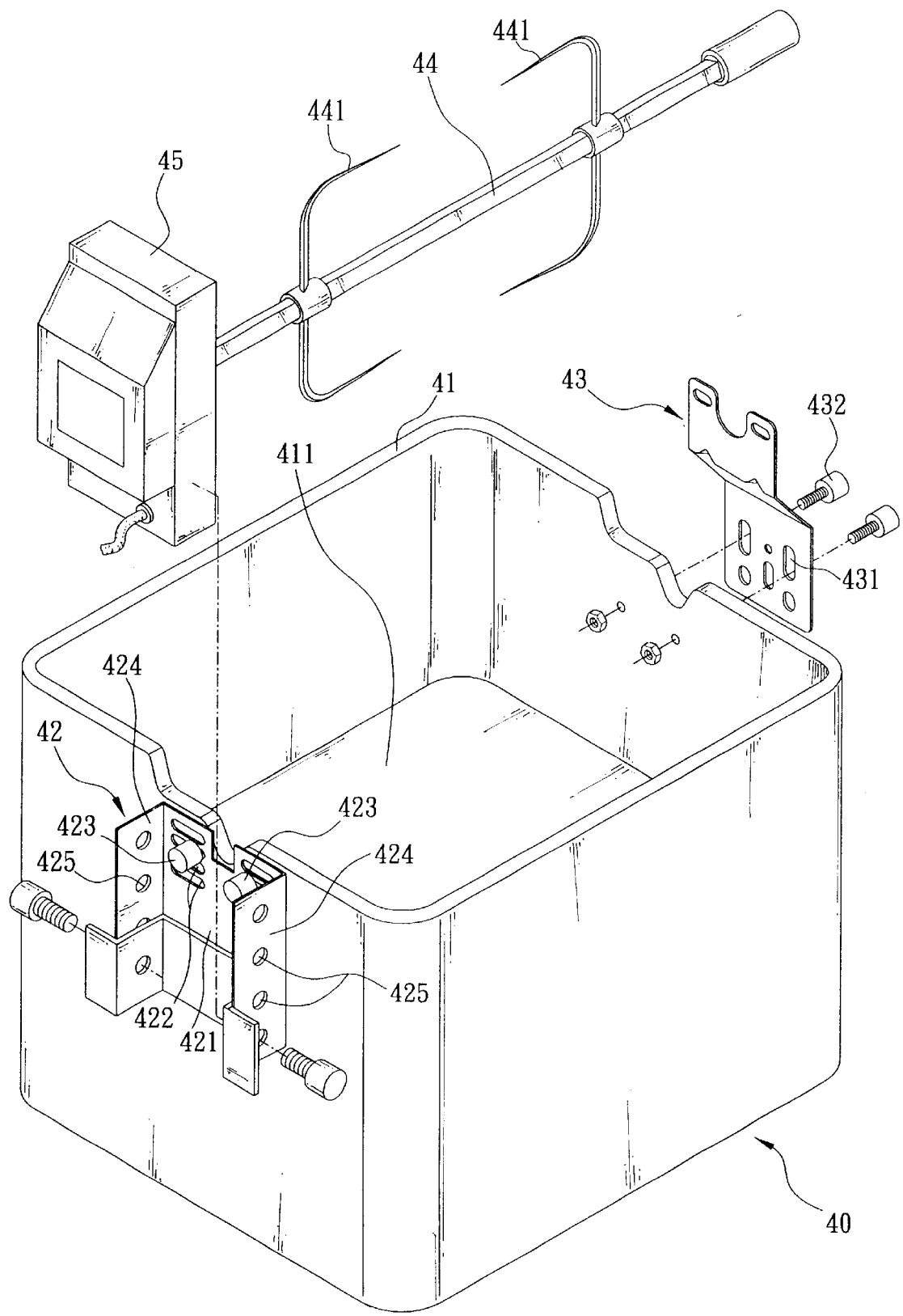
FIG. 4 is an exploded perspective view of a conventional rotisserie.

Referring to FIGS. 1 to 3, there is shown a rotisserie 10 constructed in accordance with the invention comprising an oven 11 having a longitudinal cross-section of U shape, a space 111 surrounded by oven 11 for receiving objects (not shown) used for broiling such as nozzle of oven, gridiron, charcoal, etc.; two substantially Z-shaped brackets 12 on the front and the rear sides of oven 11 respectively and each including a vertical lower first plate member 14 having a plurality of parallel elongate openings 141 (two pairs of seven elongate openings 141 on one of the first plate members 14 and two pairs of four elongate openings 141 on the other first plate member 14), a longitudinal groove (not numbered) coupled the elongate openings 141 of one pair together, and a plurality of thumbscrews 142 (two are shown) driven through openings 141 to secure brackets 12 to the front and rear sides of oven 11 respectively (FIG. 2) so that it is possible to adjust the height of brackets 12 by adjusting the positions of thumbscrews 142 in openings 141 (FIG. 3), a vertical upper second plate member 15 having a recess 151 at one end thereof, and a horizontal connection member 13 coupled between the first and the second plate members 14 and 15; a motor 17 having two spaced half cylindrical-like members 171 on the side facing the oven 11 put on the sides of second plate member 15 with bottoms supported by shoulders at the joint of connection member 13 and second plate member 15, thus securing motor 17 to second plate member 15 (FIGS. 1 and 2) and a bore 172 disposed at the position aligned to the recess 151, and a bar 16 across the brackets 12 and including a plurality of sections 161 threadedly secured together. The length of bar 16 is adjustable for being adapted to that of oven 11. One end (i.e., rear end) of bar 16 is inserted into bore 172 of motor 17, while the other end thereof is rotatably supported on the recess 151 of second plate member 15. The rotisserie 10 further comprises two opposite forks 18 (each fork has four prongs as shown) on the substantially intermediate portion of the bar 16. Prongs of forks 18 are parallel with respect to bar 16. The distance between two forks 18 may be adjusted for being adapted to the length of a thing to be broiled since forks 18 are slidably disposed on bar 16. The thing to be broiled is also impaled by forks 18 and placed on the bar 16. Finally screws 181 are driven to secure forks 18 to sections 161 of bar 16. Hence, it is possible to broil the thing by the oven 11 when the bar 16 is turned by the activated motor 17.

If user desires to adjust the distance between the broiled thing and the fire in the oven 11 (i.e., the height of brackets 12 and bar 16) simply adjust the positions of thumbscrews 142 in openings 141, i.e., there is no need to unscrew thumbscrews 142 (FIG. 3). Further, the length of bar 16 is adjustable for being adapted to that of oven 11. Furthermore, the assembly of motor 17 on the brackets 12 or disassembly therefrom is made quick and easy. Hence, the invention can eliminate problems encountered in the prior art as stated in the BACKGROUND section of the specification.

While the invention has been described by means of specific embodiments, numerous modifications and variations could be made thereto by those skilled in the art without departing from the scope and spirit of the invention set forth in the claims.

What is claimed is:

1. A rotisserie comprising:

an oven having a space therein;

two brackets each including at least one pair of parallel elongate openings, at least one longitudinal groove coupled with said elongate openings of each pair together, and a recess on one end thereof;

at least one fastener driven through said openings to secure said brackets to opposite sides of said oven respectively, a motor having at least one fastening member on one side facing said oven mounted on one of said brackets; and a bar having one end inserted into said motor and said other end rotatably supported on said recess of one of said brackets.

2. The rotisserie of claim 1, wherein said bracket further comprises a vertical lower first plate member with said parallel elongate openings and said longitudinal groove formed thereon, a vertical upper second plate member with said recess formed thereon, and a horizontal connection member coupled between said first and said second plate members.

3. The rotisserie of claim 1, wherein said bar comprises a plurality of sections threadedly secured together so that said length of said bar is adjustable for being adapted to that of said oven.

4. The rotisserie of claim 2, wherein said fastening members are put on said sides of said second plate member supported by said joint of said connection member and said second plate member.

5. The rotisserie of claim 3, further comprising two opposite forks on said bar wherein said prongs of said forks are parallel with respect to said bar, said forks are slidable and threadedly secured to said bar by second fasteners when a predetermined distance between said forks is adjusted.

\* \* \* \* \*